United States Patent [19]

Crisp, Jr.

[11] 4,426,952
[45] Jan. 24, 1984

[54] TEMPERATURE COMPENSATED DIFFERENTIAL PRESSURE INDICATING DEVICE

[75] Inventor: Robert L. Crisp, Jr., Troy, Mich.

[73] Assignee: Facet Enterprises, Inc., Tulsa, Okla.

[21] Appl. No.: 232,485

[22] Filed: Feb. 9, 1981

[51] Int. Cl.³ .............................................. G01L 9/14
[52] U.S. Cl. ...................................... 116/267; 73/38; 73/708; 116/268
[58] Field of Search ....... 116/220, 268, 267, DIG. 42; 73/38, 708, 744

[56] References Cited

U.S. PATENT DOCUMENTS

| | | | |
|---|---|---|---|
| 2,942,572 | 6/1960 | Pall | 116/DIG. 42 |
| 3,140,690 | 7/1964 | Siebel | 116/DIG. 42 |
| 3,386,410 | 6/1968 | Barnes, Jr. | 116/220 |
| 3,402,690 | 9/1968 | Willis | 116/220 |
| 3,812,816 | 5/1974 | Juhasz | 116/220 |
| 4,172,971 | 10/1979 | Silverwater | 116/220 |

Primary Examiner—Donald O. Woodiel
Attorney, Agent, or Firm—Remy J. VanOphem

[57] ABSTRACT

A differential pressure indicating device which is temperature compensated and includes a piston responsive to a pressure differential between inlet and outlet pressures. The piston is retained in a normal or first position by the force of a spring holding mechanism. The spring holding mechanism releases the piston at a predetermined excessive differential pressure condition to a second position. As this occurs, the piston actuates an indicating member to an indicating condition. A temperature sensitive bimetallic strip is provided to permit the piston to move to the second condition without activating the indicator member when the temperature of the fluid is below a predetermined temperature.

10 Claims, 3 Drawing Figures

TEMPERATURE COMPENSATED DIFFERENTIAL PRESSURE INDICATING DEVICE

FIELD OF THE INVENTION

This invention relates to pressure indicating devices and more particularly to a magnetic device for indicating the occurrence of a pressure difference greater than a predetermined value which is temperature compensated.

BACKGROUND OF THE INVENTION

In hydraulic systems wherein fluids such as oils or the like are passed through a filter, it is desirable to provide an external mechanism for indicating when the filter element has become clogged and requires replacement. Since the pressure drop across a filter increases in proportion to the accumulation of dirt therein, a suitable indication may be obtained by utilizing a differential pressure device set to be actuated when the pressure drop in the filter reaches a predetermined value. There are several known prior art devices which provide external means for indicating clogging of the filter element and which compensate for low temperature operation so that a false clogging signal is not indicated at low fluid temperatures.

One such design is shown in U.S. Pat. No. 2,942,572 to David Pall issued June 28, 1960. In this device, a first magnetic element is arranged to attract a second magnetic element as long as the two elements are separated by less than a predetermined distance. A biasing mechanism propels the second magnetic element to an indicating position whenever the predetermined distance is exceeded. The first magnetic element is movable reciprocally with a piston responsive to changes in pressure, and is normally biased towards the second magnetic element by a predetermined force. The second magnetic element is also movable reciprocally with a piston and while retained towards the first magnetic element by magnetic attraction when close enough to it, it is normally biased in a direction away from the first magnetic element. The biasing force is capable of overcoming the force of magnetic attraction whenever the first and second magnetic elements are separated by the predetermined distance. The magnitude of the force of the magnetic attraction relative to the spring biasing force determines the predetermined pressure differential at which the device is actuated. In order to prevent actuation at low temperatures, a bimetallic strip is positioned to prevent motion of the second magnetic element when the temperature is below a predetermined value. The bimetallic element is comprised of two arcuate strip portions which are joined by a weld and arranged inwardly with decreasing temperatures. The element contracts inwardly so that the inner strip extends over a flange, thus preventing actuation of the pressure indicator. Thus, the bimetallic elements are subjected to severe stresses at low temperatures. This leads to the eventual fatiguing of the bimetallic elements and failure of the pressure indicator. In addition, this device is complex and expensive to make.

Cole, in U.S. Pat. No. 3,117,550, issued Jan. 14, 1964, owned by the assignee of the present application, discloses a temperature sensitive differential pressure indicating device which includes an elastically unstable element. The elastically unstable element consists of a spherically or conically shaped bimetallic disc which is held and sealed along its periphery so that the resultant force acting on the disc from the pressure differential will be in the direction tending to cause the disc to flatten out. When a critical force is reached, however, the disc will suddenly invert with considerable force at a desired pressure and temperature combination and will stay inverted until manually reset or automatically reset when the actuation pressure is released. This device is also complex requiring precise calibration of the disc to respond to the pressure and temperature combination.

Juhasz, in U.S. Pat. No. 3,812,816, discloses a differential pressure indicator with a thermally sensitive element. The device has a pressure sensitive mechanism and an indicator operatively associated with it. The pressure sensitive mechanism moves under the influence of a differential pressure generated in a fluid handling system to allow a suitable indication when a certain pressure differential exists over the parts of the system. The device further has a locking mechanism which insures that the indication will remain until the causes of the pressure difference are corrected. The device also contains a temperature sensitive element in the form of a bimetallic coil strip which at one end is fastened to a piston body with the other end fastened to and imparting rotation to a head shank and a head. As the fluid temperature increases, the head is moved in a counterclockwise rotation by the expanding bimetallic strip until notches or cam surfaces are moved into a position behind the locking balls. The balls are then free to withdraw from partial engagement with a slot to enable the piston to freely move in response to any fluid differential pressure, so long as the fluid temperature is maintained. This design is also complex requiring precision machining of the parts in order to form the locking mechanism.

All of the aforesaid prior art designs are complex. In addition, those devices utilizing bimetallic elements try to prevent movement of a piston when the piston is subjected to the high pressure differentials due to cold fluid. This eventually leads to overstressing the parts with the eventual failure of the bimetallic elements.

SUMMARY OF THE INVENTION

The present invention is directed to a magnetic pressure indicating device which is thermally compensated so that when the piston is subjected to a high pressure drop due to cold fluid, the bimetallic strip moves and permits the piston to extend while maintaining the actuator assembly in the original unactuated position. As the fluid warms and the pressure drop decreases, the piston returns to its original position and the bimetallic strip engages a piston groove to prevent further movement of the piston without actuating the indicator. As the pressure drop of the warm fluid increases due to contamination of the filter element, the actuator assembly is moved at a predetermined pressure differential thereby causing the indicator to move to an indicating position.

The present invention provides a device for indicating a predetermined differential pressure between inlet and outlet pressures. The device includes a case member having one end, an opposite end, portions defining a chamber extending from one end toward the opposite end, and a passage formed in the opposite end and extending to the chamber for flow communication thereinbetween. The case member further has portions defining a first opening communicating with the chamber and connected to the inlet pressure and a second opening adjacent but spaced away from the first opening and communicating with the chamber and connected to the outlet pressure. A piston is disposed in the chamber and is movable between a first position and a second position. The piston is further responsive to a differential pressure between the first and second openings for movement within the chamber to the second position. A mechanism, centrally disposed in the chamber and projecting into the passage, for indicating the differential pressure between the first and second opening, is provided. Thus, above the predetermined differential pressure level, the indicator mechanism moves from a nonindicating position to an indicating position. A biasing mechanism, for urging the piston towards the first position, is also included. A temperature sensitive mechanism for preventing movement of the indicator mechanism to the indicating position below a predetermined fluid pressure when the piston moves to the second position is also provided. In addition, a first mechanism for locking the piston in the first position is provided. The first locking mechanism is further operative to hold the piston in the first position below the predetermined differential pressure and to release the piston for movement within the chamber to the second position above the predetermined pressure level. Finally, a mechanism for holding the indicating mechanism in the indicator position when the piston moves to the second position and for holding the indicator mechanism in the nonindicating position when the piston is in the first position is also provided.

It is therefore a primary object of the present invention to provide a pressure responsive indicating device which will indicate a predetermined pressure differential between inlet and outlet pressures. The device also contains a temperature sensitive element which compensates for excessive differential pressures between inlet and outlet pressures at low fluid temperatures and maintains the indicator mechanism in a nonindicating position which is simple and inexpensive to make.

It is another object of this invention to provide a device which indicates excessive pressure differential between the inlet and the outlet. The device also provides an indicator thermal lockout which directly measures the actual temperature of the fluid and yet, when subjected to high pressure drops due to low temperature fluids, permits the piston to travel to a second position but leaves the indicator mechanism in the nonindicating position.

It is still another object of this invention to provide a device which indicates an excessive differential pressure between an inlet and an outlet and contains a temperature sensitive element to compensate for high pressure drops due to cold fluid temperatures wherein false indications due to shock or vibrations when the pressure differential is near the predetermined level may be detected.

The foregoing and other objects and advantages of the invention will appear more fully hereinafter from a consideration of the detailed description which follows, taken together with accompanying drawings wherein one embodiment of the invention is illustrated by way of example. It is to be expressly understood, however, that the drawings are for illustration purposes only and are not to be construed as defining the limits of the invention.

DESCRIPTION OF THE PREFERRED EMBODIMENT

Figure 1:
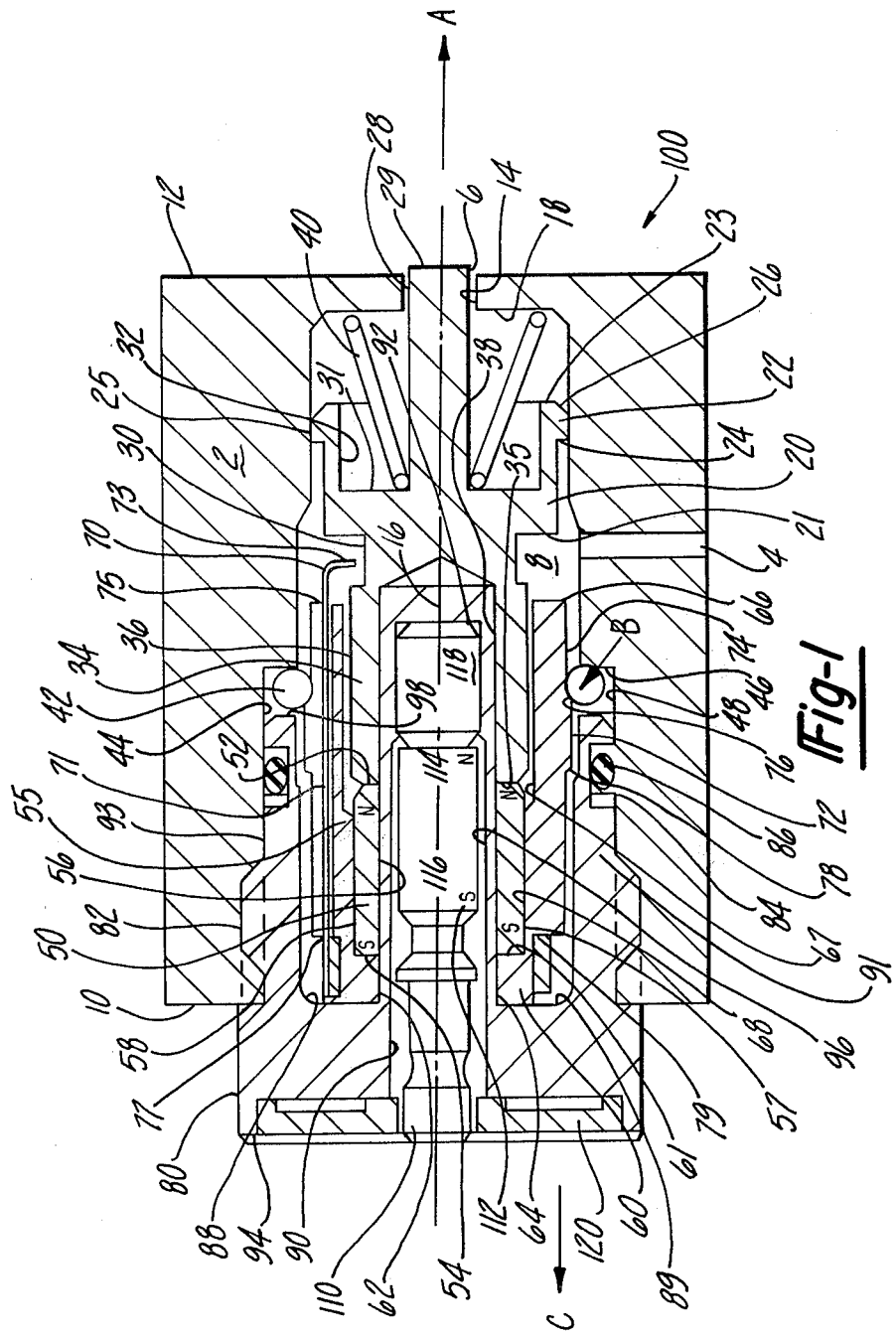
FIG. 1 is a section side view of the invention showing the piston assembly in its first position with the indicator in the nonindicating position.
Figure 2:
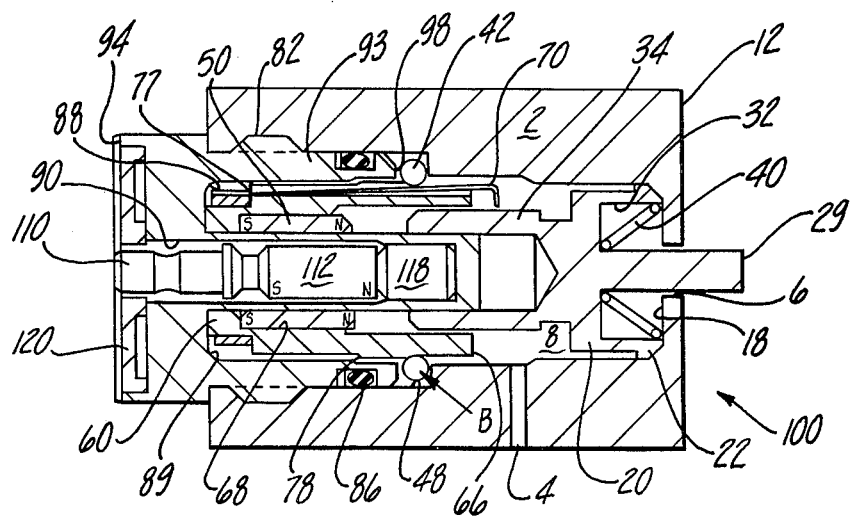
FIG. 2 is a section side view of the invention showing the piston assembly in a second position at low fluid temperatures with the indicator in the nonindicating position.
Figure 3:
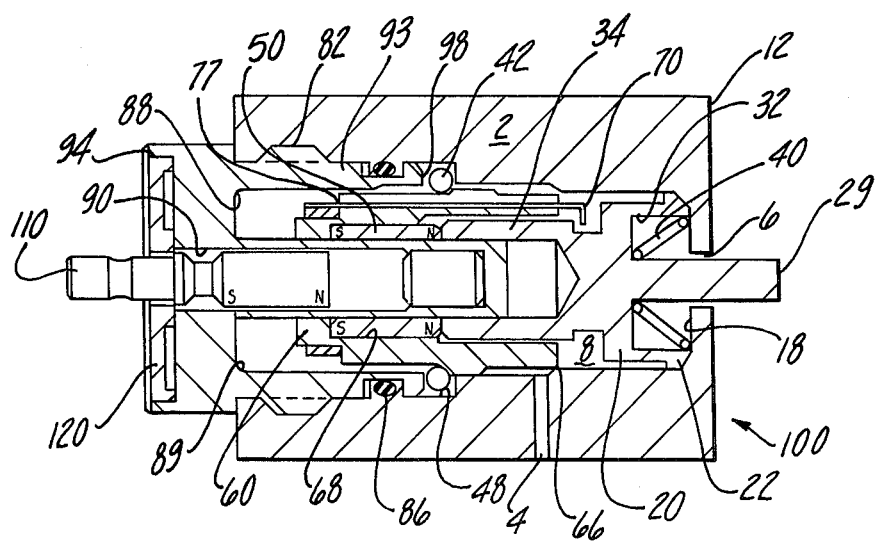
FIG. 3 is a section side view of the invention showing the piston assembly in an actuated position and wherein an indication of the excessive differential pressure is indicated.

Referring to FIGS. 1 through 3, the present invention is generally designated by the numeral 100. The device 100 has a substantially cylindrical cover or case 2 which has an inlet port 4 and an outlet port 6. The inlet port 4 communicates with the inlet portion of a gas or liquid filter system and the outlet port 6 communicates with the outlet portion of the gas or liquid filter system. Alternatively, the inlet port 4 and the outlet port 6 communicate with the upstream and downstream portions, respectively, of a hydraulic or pneumatic system (not shown) or any other similar device. The case 2 has a chamber 8 which extends from one end 10 towards the opposite end 12. A passage 14 is formed in the opposite end 12 so as to communicate with the chamber 8 formed therein. The inlet port 4 and the outlet port 6 communicate with chamber 8 thus, chamber 8 contains a liquid or gas which acts upon a piston assembly 20 slidably mounted within the chamber 8 of the case 2. The head 22 of the piston assembly 20 is disposed within the chamber 8 such that the liquid or gas from the inlet port 4 acts on one side 24 of the piston head 22. In addition, the gas or liquid from the outlet port 6 acts on the other side 26 of the piston head 22. The piston assembly 20 has a longitudinal extending portion 28 which is mounted to the piston 22. The longitudinal extending portion 28 extends along the longitudinal axis 16 of the case 2. The one end 29 of the longitudinal extending portion 28 extends through the passage 14 near the opposite end 12 of the case 2. The top end 23 of the piston head 22 has an annular cavity 32 formed therein which extends from the top end 23 towards the bottom end 21 of the piston assembly 20 for a purpose to be described later on herein. The piston assembly 20 further has a cylindrical extension member 34 which further extends from the bottom end 21 of the piston assembly 20 towards the one end 10 and terminates at a first end 35. The outer diameter 36 of the cylindrical extension member 34 is smaller than the outer diameter 25 of the piston head 22. The cylindrical extension member 34 further has a first bore 38 which extends along its longitudinal axis from the first end 35 for a purpose to be described later on herein. A first counterbore 30 is formed on the cylindrical extension member 34 adjacent to the bottom end 21 for a purpose to be described later on herein.

Interposed the bottom end 18 of the cavity 8 in the case 2 and the bottom 31 of the cavity 32 of the piston assembly 20, is biasing means 40. In the preferred embodiment, the biasing means 40 includes a helical spring member which is compressed by the movement of the piston assembly 20 in the cavity 8 towards bottom end 18. Thus, the helical coil spring is compressed and confined within the cavity 32 when the top end 23 of the piston assembly is contiguous with the bottom end 18 of the cavity 8. The biasing means 40 therefore urges the piston assembly 20 away from the bottom end 18 of the cavity 8.

An annular magnet member 50 is mounted in the cavity 8 with one end 52 adjacent the first end 35 of the cylindrical extension member 34. The magnet member 50 further has an opposite end 54 extending towards the one end 10 of the casing 2. In addition, the magnet member 50 has an inner diameter 56 which is substantially the same diameter as the first bore 38. The magnet member 50 further has an outer diameter 58. The magnet member 50 is arranged with a north pole 55 and a south pole 57 opposite the north pole 55 as shown in the drawings.

A cylindrical annular member 60 is disposed around the annular magnetic member 50 and the cylindrical extension member 34. The cylindrical annular member 60 has a first inner diameter 62 which is substantially the same as the inner diameter 56 of the annular magnet member 50. The first inner diameter 62 extends from the one end 64 of the cylindrical annular member 60 towards the opposite end 66. Adjacent but spaced away axially to the first inner diameter 62 is a second inner diameter 68 which is substantially the same as the outer diameter 58 of the annular magnet member 50. Thus, the annular magnet member 50 is disposed within the cylindrical annular member 60 such that the opposite end 54 of the annular magnet member 50 is contiguous to the bottom 61 which is formed between the first inner diameter 62 and the second inner diameter 68. The cylindrical annular member 60 further has a third inner diameter 67 which extends from the opposite end 66 to the bottom edge formed between the third inner diameter 67 and the second inner diameter 68. The cylindrical extension member 34 is disposed within the third inner diameter 67 of the cylindrical annular member 60. The third inner diameter 67 further is larger than the outer diameter 36 of the cylindrical extension member. The cylindrical annular member 60 also has a first outer diameter 72. Adjacent to the opposite end 66 is a second outer diameter 74 which terminates at an angular shoulder 76 since the second outer diameter 74 is smaller than the first outer diameter 72. The first outer diameter 72 terminates axially toward the one end 64 at an edge 78 which is formed between the first outer diameter 72 and a third outer diameter is smaller than the first outer diameter 72. Finally, a fourth outer diameter 79 is formed adjacent to the one end 64 with a step 77 formed between the third and fourth outer diameters. A longitudinal cavity 75 is formed in the cylindrical annular member 60 and extends from the opposite end 66 to the step 77. A bimetallic strip member 70 is fastened by conventional clamp means about the fourth outer diameter 79 with its bimetallic element 71 disposed within the longitudinal cavity 75. The bimetallic element also extends through the opposite end 66 of the cylindrical annular member 60. The bimetallic element 71 further has a radial portion 73 which extends into the first counterbore 30.

A housing 80 having an annular cavity 88 is formed therein concentric with a passage 90 in the housing 80 so as to extend along the longitudinal axis 16 of the case 2. The annular cavity 88 extends from one end 92 towards the opposite end 94 of the housing 80. On the other hand, the passage 90 extends from the opposite end 94 towards the one end 92 of the housing 80. The cylindrical annular member 60, the annular magnet member 50 and the cylindrical extension member 34 are each disposed within the cavity 88 such that the one end 64 of the member cylindrical annular 60 is disposed contiguous to the bottom 89 of the annular cavity 88 and the first bore 38 of the cylindrical extension member slidably engages the inside diameter 96 formed on the housing 80 by the annular cavity 88. The housing 80 further has an intermediate end 98 which is formed inbetween the one end 92 and the opposite end 94. Thus, the housing 80 is formed with an annular extension member 91 which is centrally disposed relative to the inside diameter 96. The housing 80 also has thread means 82 formed on the outer diameter 93 of the annular extension member 91 so as to threadably engage the case 2 along its inner diameter 44. The annular extension member 91 further has a groove 84 extending from the outer diameter 93 adjacent to but spaced away from the intermediate end 98 of the housing 80. In the groove 84 is disposed an O-ring seal 86. It should be noted that when the housing 80 is threadably engaged into the case 2, the intermediate end 98 is spaced away from the shoulder 46 so as to form a cavity 48 therebetween.

The cylindrical annular member 60 and the piston assembly 20 are maintained in a first or normal position by a spring member 42 which is disposed adjacent to the angular shoulder 76 of the cylindrical annular member 60. The spring member 42 is further disposed adjacent to a shoulder 46 in the cavity 48. The spring member 42 is calibrated to permit the cylindrical annular member 60 to move axially along the longitudinal axis 16 of the casing 2 along with the piston assembly 20 from its normal position when a differential pressure occurs across the inlet and outlet ports 4 and 6, respectively, that is, when the inlet fluid pressure at the inlet port 4 exceeds the outlet fluid pressure at the outlet port 6 so as to indicate a malfunction of the system in which the invention is used. Thus, when a pressure differential occurs across the inlet and outlet ports 4 and 6, respectively, the pressure acts on the piston head 22 urging the piston in direction A as indicated by the arrow in FIG. 1 against the force exerted by the spring member 42 in direction B as indicated by the arrow. At a predetermined excessive differential fluid pressure, the piston assembly 20 overcomes the force of the biasing means 40 and the force of the spring member 42 and moves in direction A. At the same time, the cylindrical annular member 60 is also moved along with the piston assembly 20 by means of the engagement of the radial portion 73 of the bimetallic strip member element 70 engaging the first counterbore 30 of the piston assembly. Thus, the cylindrical annular member 60 overcomes the force of the spring member 42 exerted on the angular shoulder 76 causing the spring member 42 to expand radially to permit the cylindrical annular member 60 to move in direction A. The poles of the annular magnet member 50 are disposed in the case 2 in close proximity relative to the poles of a magnet 112 of the pin member 110. The pin member 110 is slidably supported in passage the 90 by the magnet 112 which abuts a stop member 118 disposed at the bottom of the passage 90. Therefore, when the cylindrical annular member moves, it moves the annular magnet member 50 with it. Thus, the poles 55, 57 of the annular magnet member 50 are moved in direction A in response to a pressure differential on the piston assembly 20 and the magnetic flux line of the opposite pole members displace the magnet 112 in direction C thereby causing the pin member 110 to move in a direction C. Thus, the one end of the pin member 110 extends or protrudes beyond an end cap 120 which is mounted to the housing 80 so as to provide an indication of the excessive differential pressure and causing the one end 29 of the longitudinal extending portion 28 to extend beyond the opposite end 12 of the case 2 as shown in FIG. 3.

However, when the fluid temperature is below a predetermined level, as for example by way of nonlimiting example, below 125° F., the radial portion 73 moves radially away from the longitudinal axis 16 to permit the piston assembly 20 to move relative to the cylindrical annular member 60. Thus, when the piston assembly 20 moves in response to a pressure differential at temperatures below the predetermined temperature level, the piston assembly moves in direction A but does not move the annular magnet member 50 and thus the pin member 110 is not moved to indicate the excessive differential pressure condition as shown in FIG. 2. Those skilled in the art will recognize that the bimetallic strip member 70 may be calibrated to respond to various fluid temperature levels as the case may be in practicing my invention.

When the fluid temperature is above a predetermined temperature level, the radial portion 73 of the bimetallic strip member element 70 engages the first counterbore 30 so that the cylindrical annular member 60 and the annular magnet member 50 move in direction A in response to a pressure differential in the inlet and outlet ports 4 and 6, respectively as previously described.

In order to reset the device, that is, when the pin member 110 extends beyond the end cap 120, the spring member 42 must be re-engaged with the annular shoulder 76 of the cylindrical annular member 60. This is automatically accomplished by the biasing means 40 urging the piston assembly 20 in a direction opposite to direction A, after the condition causing the excessive differential pressure acting on the piston assembly has been corrected and by manually pushing the pin member 110 in a direction opposite to direction C. Upon resetting the device, the device is returned to the position shown in FIG. 1 and the pin member 110 is maintained in the normal position by the action of the magnet member 50 acting on the magnet 112 of the pin member 110. Those skilled in the art will recognize that in the normal position, the north pole 55 of the annular magnet member 50 is aligned adjacent to the north pole 114 of the magnet 112. Similarly, the south pole 57 of the annular magnet member 50 is aligned adjacent to the south pole 116 of the magnet 112. When the annular magnet member 50 moves in direction A, however, the south pole 57 moves adjacent to the north pole 114 which, due to the repelling action of the magnets, causes the pin member 110 to move axially along the longitudinal axis 16 in direction C.

In this connection, it is noted that when the device is used with a filter or other system as heretofore indicated, the device is generally surrounded by a bore or housing (not shown). Thus, to reset the device, as previously described, the pin member 110 must be reinserted into the passage 90.

It should be understood, that with the structural arrangement heretofore described, false excessive differential pressure indications may be provided due to shock or vibration as the predetermined excessive differential pressure is approached so as to actuate the piston assembly 20. An advantage of the present invention is that such false indications may be readily detected. This is accomplished by manually depressing the pin member 110 into the passage 90. If the pin member 110 remains as shown in FIG. 1, a false excessive differential pressure indication has been experienced. If however, the pin member 110 returns to the actuated position as shown in FIG. 3, a true excessive differential pressure indication has been experienced and the purposes of the invention have been achieved.

Although but a single embodiment of the invention has been illustrated and described in detail, it is to be expressly understood that the invention heretofore described is not limited to that embodiment. Various changes may also be made in the design and arrangements of the parts without departing from the spirit and scope of the invention as set forth in the appended claims.

What I claim is:

1. A device for indicating a predetermined pressure differential between inlet and outlet pressures, said device comprising:
    a case member having one end, an opposite end and portions defining a chamber extending from said one end toward said opposite end and a passage formed in said opposite end and extending to said chamber for flow communication therebetween;
    a first opening in said case member communicating with said chamber and connected to the inlet pressure;
    a second opening in said case member adjacent but spaced away from said first opening and communication with said chamber and connected to the outlet pressure;
    a piston centrally disposed in said chamber, said piston further being responsive to a predetermined pressure differential between said first and second openings for movement within said chamber from a first position to a second position, said piston further having a piston head extending transversely across said chamber;
    indicator means, centrally disposed in said chamber for indicating said pressure differential between said first and second openings such that above a predetermined pressure level differential said indicator means moves from a nonindicating position to an indicating position;
    biasing means for urging said piston towards said first position; and
    temperature sensitive means, for preventing movement of said indicator means to said indicating position below a predetermined fluid temperature when said piston moves from said first position to said second position.

2. A device as claimed in claim 1, wherein said piston further comprises a longitudinal extending portion mounted to and extending from said piston head, said piston head further comprising a top end, a bottom end opposite said top end and a portion defining an annular cavity extending longitudinally from said top end of said piston head end, said longitudinal extending portion further connected to said top end of said piston head; and
    wherein said biasing means further comprises a helical spring member disposed in said annular cavity of said piston head and extending into said chamber, said helical spring member urging said piston towards said first position.

3. A device as claimed in claim 2 wherein said piston further having a cylindrical extension member extending longitudinally from said bottom end of said piston head, said cylindrical extension member having a first end extending towards said one end of said casing and having a portion defining a first bore extending along the longitudinal axis of said cylindrical extension member from said first end toward said bottom end of said piston head.

4. A device as claimed in claim 3 wherein said indicator means further comprises:
an annular magnet member disposed in said annular cavity, said annular magnet member having one end adjacent to said first end of said cylindrical extension member, an opposite end extending towards said one end of said casing, an inner diameter extending between said one end and said opposite end and an outer diameter extending between said one end and said opposite end, said annular magnet member further having a north magnetic pole adjacent said one end and a south magnetic pole adjacent said opposite end, said north and south magnetic poles generating first magnetic flux lines; and
a pin member disposed in said first bore of said cylindrical extension member, said pin member having one end and a magnet at the opposite end, said magnet having a north magnet pole adjacent to the opposite end and a south magnet pole adjacent but spaced away from said north magnet member, said north and south magnet poles generating second magnetic flux lines whereby when said annular magnet member is moved toward said one end of said casing, said first magnetic flux lines of said annular magnet member repel said second magnetic flux lines of said pin member to move said pin member such that said one end of said pin member extends beyond said opposite end of said casing.

5. A device as claimed in claim 4 wherein said temperature sensitive means further comprises:
a cylindrical annular member disposed around said annular magnet member and said cylindrical extension member, said cylindrical annular member having one end, an opposite end and a portion defining a longitudinal cavity extending from said opposite end towards the one end;
a bimetallic strip member fastened to the periphery of said cylindrical annular member and extending through said longitudinal cavity, said bimetallic strip member having a radial portion; and
means for engaging said radial portion to said piston above a predetermined temperature such that said cylindrical annular member and said annular magnet member translate axially along with said piston and for disengaging said radial portion from said piston below said predetermined temperature.

6. A pressure differential responsive device for indicating a predetermined pressure differential between an inlet pressure and an outlet pressure, said device comprising:
a case member having one end, an opposite end and portions defining a chamber extending from said one end toward said opposite end and a passage formed in said opposite end and extending to said chamber for flow communication therebetween, said case member further having portions defining a first opening communicating with said chamber and connected to said inlet pressure and a second opening adjacent but spaced away from said first opening and communicating with said chamber and connected to said outlet pressure;
a piston disposed in said chamber, said piston being movable between a first position and a second position, said piston further being responsive to pressure differential between said first and second openings for movement within said chamber between said first and second positions;
biasing means disposed in said cavity for urging said piston towards said first position;
means for locking said piston in said first position, said first locking means further being operative to hold said piston in said first position below said predetermined pressure differential and to release said piston for movement within said chamber to said second position above such predetermined pressure;
a cavity in said piston;
an indicator member centrally disposed in said cavity of said piston;
means for moving said indicator member in response to pressure differential such that above said predetermined pressure differential level said indicator member moves from a nonindicating position to an indicating position;
temperature sensitive means for preventing movement of said indicating means to said indicating position below a predetermined fluid temperature when said piston moves to said second position; and
means for holding said indicator member in said indicating position when said piston moves to said second position and for holding said indicator member in said nonindicating position when said piston is in said first position.

7. A device as claimed in claim 6 wherein said piston comprises a piston head, a longitudinal extending portion mounted to and extending from the top said piston head, and a cylindrical extension member mounted to the bottom of said piston head, said cylindrical extension member comprising a first end extending towards said one end of said case member and having a portion defining a first bore extending along the longitudinal axis of said cylindrical extension from said first end toward the bottom end of said piston head.

8. A device as claimed in claim 7 wherein said moving means further comprises:
an annular magnet member disposed in said annular cavity, said annular magnet member having one end adjacent to said first end of said cylindrical extension member, an opposite end extending towards said one end of said case member, an inner diameter extending between said one end and said opposite end and an outer diameter extending between said one end and said opposite end, said annular magnet member further having a north magnetic pole adjacent said one end and a south magnetic pole adjacent said opposite end, said north and south magnetic poles generating first magnetic flux lines; and
a pin member disposed in said first bore of said cylindrical extension member, said pin member having one end and a magnet at the opposite end, said magnet having a north magnetic pole adjacent to the opposite end and a south magnetic pole adjacent but spaced away from said north magnetic pole, said north and south magnetic poles generating second magnetic flux lines whereby when said annular magnetic member is moved toward said one end of said case member, said first magnetic flux lines of said annular magnet member repel said second magnetic flux lines of said pin member to move said pin member such that said one end of said pin member extends beyond said opposite end of said case member.

9. A device as claimed in claim 8 wherein said temperature sensitive means further comprises:

a cylindrical annular member disposed around said annular magnet member and said cylindrical extension member, said cylindrical annular member having one end, an opposite end and a portion defining a longitudinal cavity extending from said opposite end toward the one end;

a bimetallic strip member fastened to the periphery of said cylindrical annular member and extending through said longitudinal cavity, said bimetallic strip member having a radial portion; and means for engaging said radial portion to said piston above a predetermined temperature such that said cylindrical annular member and said annular magnet member translate axially along with said piston and for disengaging said radial portion from said piston below said predetermined temperature.

10. A device as claimed in claim 9 wherein said predetermined temperature is 125° F.

* * * * *

UNITED STATES PATENT AND TRADEMARK OFFICE
CERTIFICATE OF CORRECTION

PATENT NO. : 4,426,952

DATED : January 24, 1984

INVENTOR(S) : Robert L. Crisp Jr.

It is certified that error appears in the above-identified patent and that said Letters Patent is hereby corrected as shown below:

Column 3, line 27, delete "indicating" and insert ---- indicator ----.

Column 3, line 28, delete "indicator" and insert ---- indicating ----.

Column 4, line 32, after "with" insert ---- the ----.

Column 4, line 61, delete "cavity 8" and insert ---- chamber 8 ----.

Column 4, line 66, delete "cavity 8" and insert ---- chamber 8 ----.

Column 5, line 2, delete "cavity 8" and insert ---- chamber 8 ----.

UNITED STATES PATENT AND TRADEMARK OFFICE
CERTIFICATE OF CORRECTION

PATENT NO. : 4,426,952
DATED : January 24, 1984
INVENTOR(S) : Robert L. Crisp Jr.

Page 2 of 3

It is certified that error appears in the above-identified patent and that said Letters Patent is hereby corrected as shown below:

Column 5, line 4, delete "cavity 8" and insert ---- chamber 8 ----.

Column 5, line 6, delete "cavity 8" and insert ---- chamber 8 ----.

Column 5, line 17, delete "magnetic" and insert ---- magnet ----.

Column 5, line 47, after "diameter" insert ---- which ----.

Column 6, line 3, delete "member cylindrical annular" and insert ---- cylindrical annular member ----.

Column 6, line 58, delete "passage the" and insert ---- the passage ----.

In the Claims

Column 8, line 30, delete "cation" and insert ---- cating ----.

Column 8, line 55, delete "further comprising" and insert ---- having ----.

Column 8, line 67, delete "having" and insert ---- comprises ----.

UNITED STATES PATENT AND TRADEMARK OFFICE
CERTIFICATE OF CORRECTION

PATENT NO. : 4,426,952

DATED : January 24, 1984

INVENTOR(S) : Robert L. Crisp Jr.

It is certified that error appears in the above-identified patent and that said Letters Patent is hereby corrected as shown below:

Column 9, line 1, delete "having" and insert ---- further comprising ----.

Column 10, line 65, delete "pole," and insert ---- pole member, ----.

Column 10, line 67, delete "magnetic" and insert ---- magnet ----.

Signed and Sealed this

Twenty-eighth Day of April, 1987

Attest:

DONALD J. QUIGG

*Attesting Officer*     *Commissioner of Patents and Trademarks*